United States Patent [19]

Nokes

[11] 4,354,339
[45] Oct. 19, 1982

[54] LAWN MOWER APPARATUS

[76] Inventor: Clarence Nokes, 120 Third St., NE., Washington, D.C. 20002

[21] Appl. No.: 207,031

[22] Filed: Nov. 14, 1980

[51] Int. Cl.³ .............................................. A01D 75/28
[52] U.S. Cl. ....................................... 56/10.2; 200/46
[58] Field of Search ........ 56/294, 295, 10.2, DIG. 15; 200/46, 153 LA, 153 LB, 153 T; 364/436, 900; 235/448

[56] References Cited

U.S. PATENT DOCUMENTS

| | | | |
|---|---|---|---|
| 3,196,403 | 7/1965 | Ivins | 364/900 |
| 3,566,052 | 2/1971 | Mindell | 200/46 |
| 3,586,805 | 6/1971 | Ziegler | 200/46 |
| 3,679,853 | 7/1972 | Holzer | 200/46 |
| 3,845,289 | 10/1974 | French | 364/436 |
| 4,133,404 | 1/1979 | Griffin | 56/10.2 |
| 4,178,741 | 12/1979 | Lonn et al. | 56/10.2 |
| 4,180,964 | 1/1980 | Pansire | 56/10.2 |
| 4,184,559 | 1/1980 | Rass | 56/10.2 |

Primary Examiner—Robert A. Hafer
Attorney, Agent, or Firm—James C. Wray

[57] ABSTRACT

A programmed steering and cutting blade control apparatus for self-contained lawn mowers with a nylon tape having rectangular members disposed on the upper and lower surfaces of the nylon tape which extends between two reels where the rectangular members actuate micro switches disposed below the nylon tape and actuate micro switches disposed above the nylon tape where such upper micro switches are connected to a plate which is reversible so as in one instance to reverse the plate and the micro switches are disposed away from the nylon tape and not actuated. Two lower micro switches actuate a turning wheel motor and a third micro switch actuates a brake. The upper micro switch actuates the cutting blades. The movement of the programmed nylon tape is synchronized with the movement of the drive wheels to ensure the self-contained lawn mower moves along the preplanned route.

34 Claims, 13 Drawing Figures

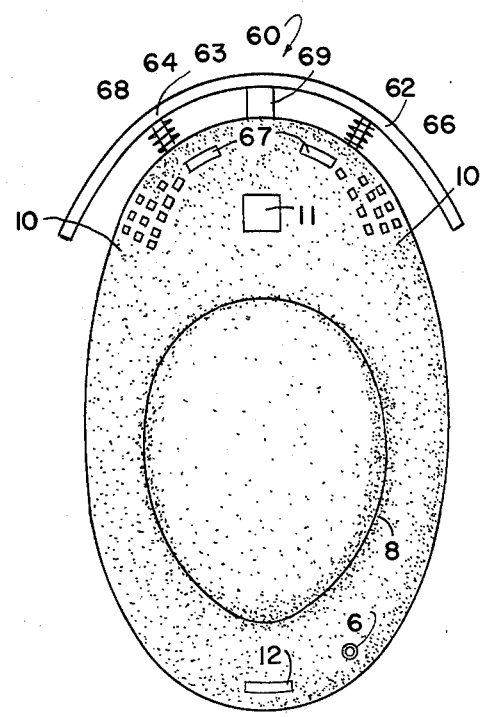

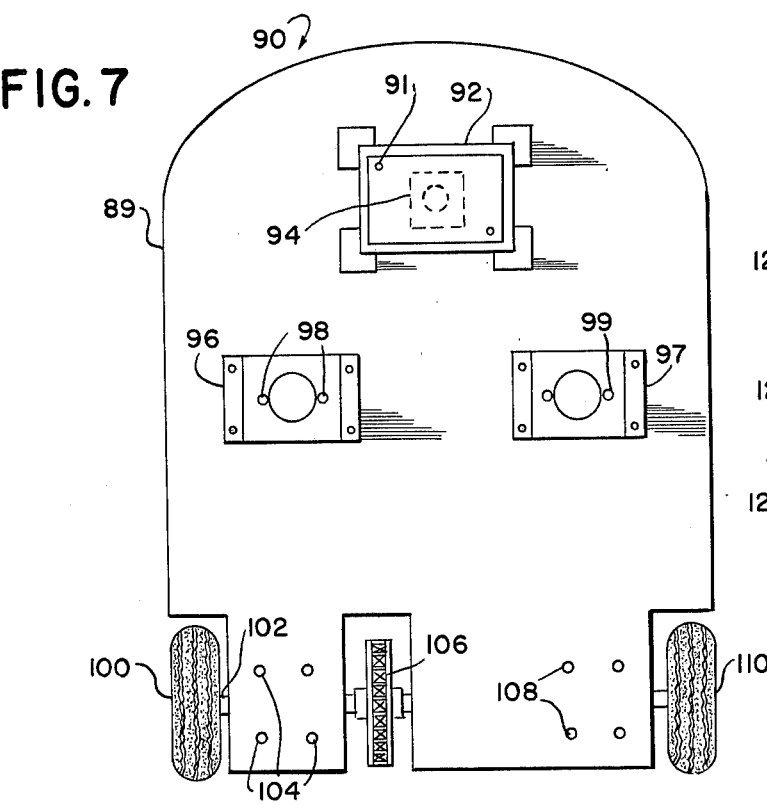
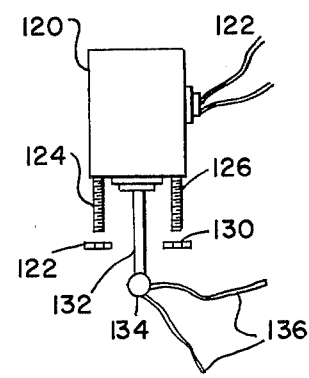
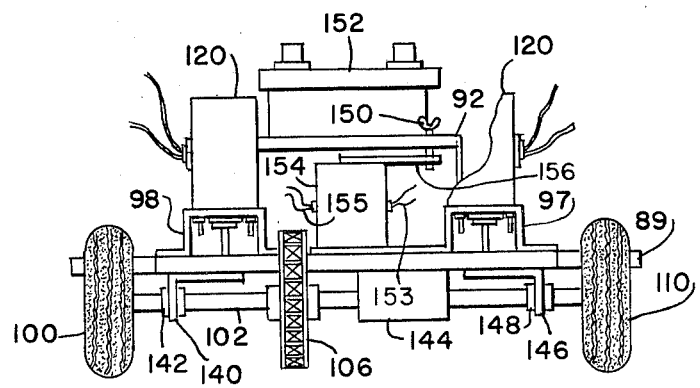
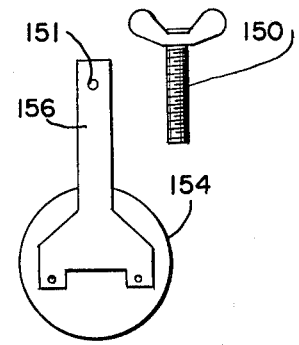
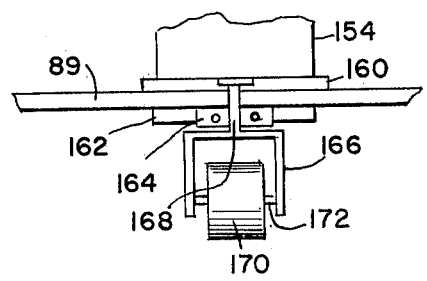
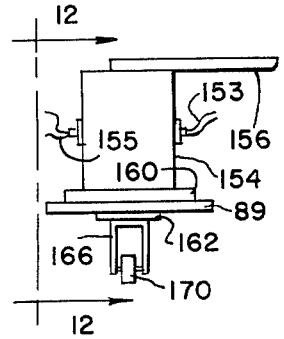

LAWN MOWER APPARATUS

BACKGROUND OF THE INVENTION

In the past the control apparatus for self-contained lawn mowers were basically of the type as disclosed in applicant's U.S. Pat. No. 3,650,097. As disclosed in that patent, a mechanical means was used in which to transfer the programmed information to steer the self-contained lawn mower on a preplanned route. The applicant hereby incorporates by reference the disclosure and claims of U.S. Pat. No. 3,650,097.

The above cited patent utilized the mechanical transfer of information so as to direct the steering wheel 186 as shown in FIG. 6 of the above cited patent. This method of steering is functional, but requires a good deal of gearing in order to effectuate the proper turns necessary for the lawn mower to cut along its preplanned route. The self-contained lawn mower as disclosed in U.S. Pat. No. 3,650,097 calls for initially starting the lawn mower blade when the mower begins to cut and the cutting blade does not shut off until the mower has completed cutting along the pre-planned route and the programmed tape has been completely run through its entire cycle. There is no allowance to turn the cutting blade on and off at intermediate stages during the pre-planned route of the lawn mower.

The present invention overcomes the use of a mechanical method of steering and provides an improved apparatus and method in which to steer and control a plurality of cutting blades.

SUMMARY OF THE INVENTION

The present invention is a control apparatus for self-contained lawn mowers. The present invention replaces the mechanical means for steering the self-contained lawn mower with a control apparatus which both controls steering and controls a plurality of cutting blades. This control apparatus replaces the cumbersome mechanical apparatus which has been used in previous self-contained lawn mowers. The basic structure of the lawn mower is substantially the same as is disclosed in U.S. Pat. No. 3,650,097, except for minor changes in the outer housing and a few internal structures.

The internal structural changes that are necessary for conversion of the self-contained lawn mower to adapt to use of the improved control system are a reversible turning wheel motor disposed above and connected to the single turning wheel and a unidirectional cutting blade motor disposed above each cutting blade. The present invention utilizes two cutting blades turning in opposition to one another in a horizontal plane and such cutting blades are vertically adjustable. The cutting blades when rotating have some degree of intermeshing.

The cutting blades are adjacent to one another and disposed in the forward position of the housing near the driving wheels.

The self-contained lawn mower can discharge cut grass from both sides of the housing. This allows easy discharge of grass cut from each of the cutting blades.

The present invention serves to eliminate the need for the plurality of pulleys and belts as are disclosed in the U.S. Pat. No. 3,650,097.

The improved control apparatus is disposed within the protective housing in substantially the same position as the mechanical control apparatus of the cited patent.

The movement of the nylon tape is synchronized with the programmed movement of the drive wheels. This synchronization is important to the invention. If the self-contained lawn mower is caused to slow down or speed up because of the terrain, the tape and drive wheels will remain in synchronization. This will allow the tape position to remain consistent with the self-contained lawn mower's position along the preplanned route. Without such synchronization, the self-contained lawn mower could go off the preplanned route and cutting of the lawn, golf course, etc. wound not be complete or along the preplanned route.

The synchronization of the drive wheels and the tape is essential as above specified for the self-contained lawn mower to cut along the preplanned route. Although, there is synchronization to ensure that the preplanned route is followed, the drive wheels must remain in positive contact with the ground at all times and not be subject to any slippage. To make this possible, the invention contemplates the use of different types of tires for different terrainal or cutting surface conditions (i.e., wet versus dry grass; hilly versus flat land). One embodiment of the invention contemplates the use of tires wherein a spiked band can be attached which will provide both positive traction and can be used to aerate the surface to be cut.

The invention has instituted a number of safety devices. The self-contained lawn mower has an antenna used to determine the position of the unit; a headlight or headlights to indicate the unit's position for night cutting; and a bumper system disposed about the forward portion of the unit which is pressure sensitive.

The bumper has a predetermined pressure at which the self-contained lawn mower will be deactivated. When the bumper is disposed on the forward portion of the self-contained lawn mower, and contacts an obstacle, this contact will cause the unit to deactivate until the obstacle is removed.

In situations where it is desired to manually move and turn the self-contained lawn mower and the mower is not energized (by moving the mower from the place of storage to the starting point for the pre-planned route), or turning the mower after there has been failure of the turning motor, the turning motor can be released from rigid attachment to the battery support and allowed to "free wheel" with the turning of the turning wheel.

In the primary embodiment, the turning motor attaches to the shaft of the turning wheel. To keep the motor body from rotating, a bracket is attached to the top of the motor. The bracket has an arm which extends radially outward from the motor. The distal end of the bracket has a hole in which a wing screw is screwed and said wing screw is disposed through the frame and into the bracket.

When it is desired to move the self-contained lawn mower manually and the mower is not energized, the wing screw is removed and the turning motor will "free wheel" in accordance with the turning of the turning wheel.

The control apparatus has a nylon tape which is disposed between two reel members that are spaced apart. The reel members are used for reeling and unreeling the nylon tape and turn at approximately the same speed so as to tension the nylon tape during the reeling and unreeling while in operation. The tape has rectangular members of approximately the same width and thickness, but vary in length, fixed thereon. The rectangular members are made of a substance which is flexible, thus, the rectangular members can be wound on the reel members with the nylon tape to which they are attached.

In the primary embodiment of the invention, the underside of the nylon tape has rectangular members aligned in three rows and such rectangular members are disposed on the full length of the nylon tape. The upper surface has two rows of rectangular members where these rectangular members are disposed on the full length of the nylon tape.

In another embodiment of the invention, the nylon tape only has rectangular members aligned on the lower surface and such rectangular members are disposed on the full length of the nylon tape. The upper side of the nylon tape has no rectangular members thereon disposed. This configuration is used where only a standard cutting method is desired.

The rectangular members on the upper and/or lower surfaces of the nylon tape in the two and three rows respectively comprise a plurality of discrete rectangular members which vary in length and correspond to the programming necessary for steering the lawn mower and controlling the cutting blades. The lower actuating means consists of three micro switches in substantial lateral alignment in respect to the nylon tape. The three micro switches are substantially in alignment with the three rows of rectangular members disposed on the nylon tape.

The micro switches and nylon tape with the rectangular members thereon disposed are in a relationship such that the micro switches are in a open position when not in contact with one of the rectangular members and in a closed position when in contact with one of the rectangular members. The three micro switches in substantial lateral alignment when actuated perform different functions. One micro switch is connected through leads to the turning motor and when actuated will turn said turning motor in a first direction. A second micro switch is connected to the same turning motor and when actuated turns the said turning motor in an opposite direction. A third micro switch when closed activates a brake means to stop the drive wheels.

An upper actuating means which is disposed above the nylon tape has two micro switches attached to a plate. The upper actuating means is used to control the cutting blades for producing special cuts. The two micro switches are connected to a plate and are in substantial alignment with the two rows of rectangular members fixed to the nylon tape. The plate is reversible such that the micro switches thereon disposed may be actuated or not actuated by the rectangular members. When a special cut is desired, the plate has the micro switches disposed toward the nylon tape to be actuated by the rectangular members thereon disposed. When a special cut is not desired, the plate is removed and turned about the longitudinal axis of the plate such that the micro switches are disposed away from the nylon tape with the rectangular members thereon disposed.

The micro switches on the upper actuating means in a normal position are closed. It is only when they are actuated by the rectangular members that the micro switches open, thus stopping the respective cutting blade. When the normal cutting is desired, the plate is disposed such that the micro switches are disposed away from the nylon tape. It is only when a special cut is desired that the micro switches are disposed so that they may be actuated by the rectangular members on the tape.

The object of the present invention is to provide an improved steering and cutting blade control apparatus for self-contained lawn mowers.

Another object of the invention is to provide a programmed nylon tape particularly programmed for a specific yard, golf course, etc., which will direct a self-contained lawn mower to cut said lawn, golf course, etc. without any additional assistance.

A further object of the invention is to provide a steering and cutting blade control apparatus which can perform special cuts in addition to providing a normal cut for a lawn, golf course, etc.

Another object of the invention is to provide a easily removable plate with micro switches thereon disposed which can quickly change the lawn mower from one that does special cuts to one that will do a normal cut and vice versa for a lawn, golf course, etc.

A further object of the invention is to provide a method of synchronizing the movement of the nylon tape with the movement of the drive wheels where there are changes in terrain and the self-contained lawn mower will slow or speed up.

A further object of the invention is to provide a self-contained lawn mower that will cut along a preplanned route and aerate the surface upon which it cuts.

Another object of the invention is to provide a self-contained lawn mower which will discharge grass cut on both sides of the apparatus.

Another object of the invention is to provide a self-contained lawn mower capable of cutting a lawn, golf course, etc. by selectively energizing the cutting blades, changing the condition of the cutting blades and then again selectively energizing the cutting blades.

Another object of the invention is to provide a self-contained lawn mower capable of cutting a specific design in a lawn, golf course, etc.

A further object of the present invention is to provide a safety system whereby the self-contained lawn mower will be de-energized if said mower contacts an obstacle and will not be re-energized unless the obstacle is removed.

Another object of the present invention is to provide a means to manually turn the self-contained lawn mower apparatus by releasing the turning motor and allowing said motor to "free wheel" with the turning of the turning wheel.

BRIEF DESCRIPTION OF THE DRAWINGS

FIG. 4 shows a top view of an embodiment of the self-contained lawn mower with safety features.

FIG. 5 shows a side view of the drive motor and sprockets for driving the wheels and turning the nylon tape.

FIG. 6 shows 6—6 of FIG. 5.

FIG. 7 shows the top view of the base of the self-contained lawn mower apparatus.

FIG. 8 shows a side view of the cutting blade motor with cutting blades.

FIG. 9 shows a front view of the self-contained lawn mower base.

FIG. 10 shows a top view of the turning motor and securing wing screw.

FIG. 11 shows the turning motor with the turning wheel attached.

FIG. 12 shows a view of FIG. 11 at 12—12.

DETAILED DESCRIPTION OF THE DRAWINGS

Figure 1:
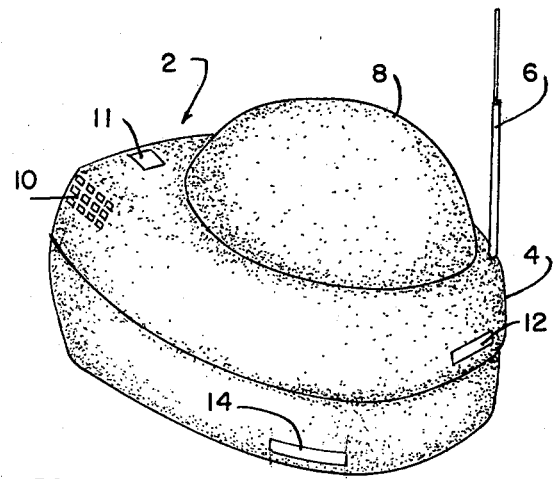
FIG. 1 shows an elevated view of the exterior of a self-contained lawn mower apparatus.

FIG. 1 shows the exterior housing of the self-contained lawn mower generally at 2. The housing in an improved apparatus has a lower housing 4 made of a light durable material and an upper bubble-shaped housing 8 which may be of a transparent plastic material or opaque material of the same type as the lower housing 4. Antenna 6 in the preferred embodiment has a flag on a distal end to indicate location of the self-contained lawn mower unit. Air vents for the intake of air are indicated at 10, 11 and 12. Discharge port 14 is used to discharge the grass mowed by the self-contained unit and there is another such discharge port in substantially the same position on the opposite side of the self-contained lawn mower unit for grass discharge.

There are two cutting blades disposed within the housing 4. The discharge port 14 allows for the discharge of grass cut by the two blades. One blade will discharge grass cut through one port and the other blade will discharge grass cut through the other port. Thus, a discharge port for each blade is provided for simultaneous discharge of grass to each side of the self-contained lawn mower.

Figure 2:
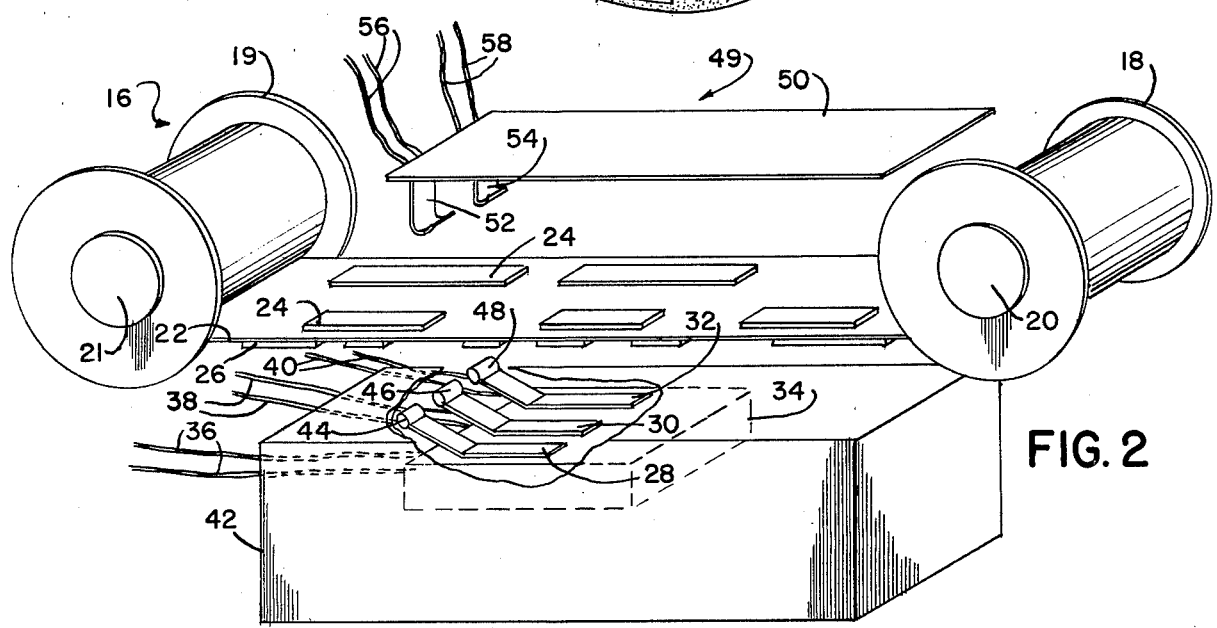
FIG. 2 shows an exploded view of the programmed steering and cutting blade control apparatus configured for performing special cuts.

FIG. 2 shows the programmed steering and cutting control apparatus configured to conduct special cuts and is generally shown at 16. The control unit consists of a nylon tape 22 with rectangular members fixed on the upper and lower surfaces. The rectangular members shown at 24 and 26 are fixed to the nylon tape throughout its whole length. The rectangular members are placed in two rows on the upper surface and on three rows on the lower surface. The rectangular members 24 on the upper surface correspond to desired programming necessary to effectuate a particular special cut accomplished by shutting the cutting blades off at specific times. The rectangular members on the lower surface, which are generally shown at 26 represent the programming necessary to effectuate left and right turns and braking for the self-contained control unit to cut a particular yard, golf course, etc. along a pre-planned route.

The nylon tape 22 with the rectangular members 24 and 26 thereon disposed is extended between reels 18 and 19. The reels 18 and 19 rotate about post 20 and 21 respectively. Just prior to the beginning of cutting, the nylon tape 22 is wound about reel 18 except for a portion that extends from reel 18 to reel 19. In operation, a drive means turns reel 19 in a clockwise direction, thus reeling the nylon tape 22 onto reel 19 and unreeling the nylon tape 22 with the programming in the form of rectangular members 24 and 26 from reel 18. At the completion of the tape, substantially all the nylon tape 22 with rectangular members 24 and 26 thereon disposed is wound about reel 19 except for a portion extending from reel 19 to reel 18, the lawn mower will stop and the tape can be removed and rewound for a subsequent use of the self-contained lawn mower.

The rectangular members 24 and 26 are disposed differently on the respective upper and lower surfaces of nylon tape 22. Rectangular members 24 are disposed in two rows where each row is in substantial longitudinal alignment throughout the length of the nylon tape 22. The rows consist of discrete rectangular members and all of the rectangular members are of substantially the same width and thickness, but vary in length to correspond to the particular length of time which the micro switch will be actuated in an open position. The rectangular members 24 are for programming the on and off time periods for the cutting blade for producing a special cut.

The lower surface of the nylon tape 22 has rectangular members 26 disposed in three rows along the longitudinal length of said nylon tape 22. Each row consists of discrete rectangular members of substantially the same width and thickness but vary in length according to the programming necessary for conducting left or right turns and braking.

The upper actuating means generally shown at 49 consists of a plate 50, micro switches 52 and 54 having paired leads 56 and 58 respectively. The upper actuating means 49 is removable and rotatable about the longitudinal axis. In this, it is meant that plate 50 can be disposed with the micro switches down as shown in FIG. 2 or up as is shown in FIG. 3.

The micro switches 52 and 54 when in the normal closed position have shank members which extend perpendicular to plate 50 and said shank members terminate in a curved end which substantially forms a J. When the upper actuating means 49 is in an operating position, the plate is supported such that the perpendicular portions of the micro switch are resting against the tape 22 and the plate 50 is substantially parallel to said nylon tape 22. In this configuration, the micro switches 52 and 54 are in a closed position. When the drive means for reel 19 is actuated the nylon tape 22 is being reeled onto said reel member 19, the rectangular member 24 will contact micro switches 52 and 54. When the micro switches are contacted by said rectangular members 24, a level of drag is created which moves the micro switch to the left, thus breaking the circuit and stopping the associated cutting blade. After the rectangular member 24 passes from under the micro switch, the shank member will return to its original perpendicular position, thus again closing the circuit and putting the particular cutting blade back into rotary operation. This configuration is only used when a special programmed cutting pattern is desired.

Figure 3:
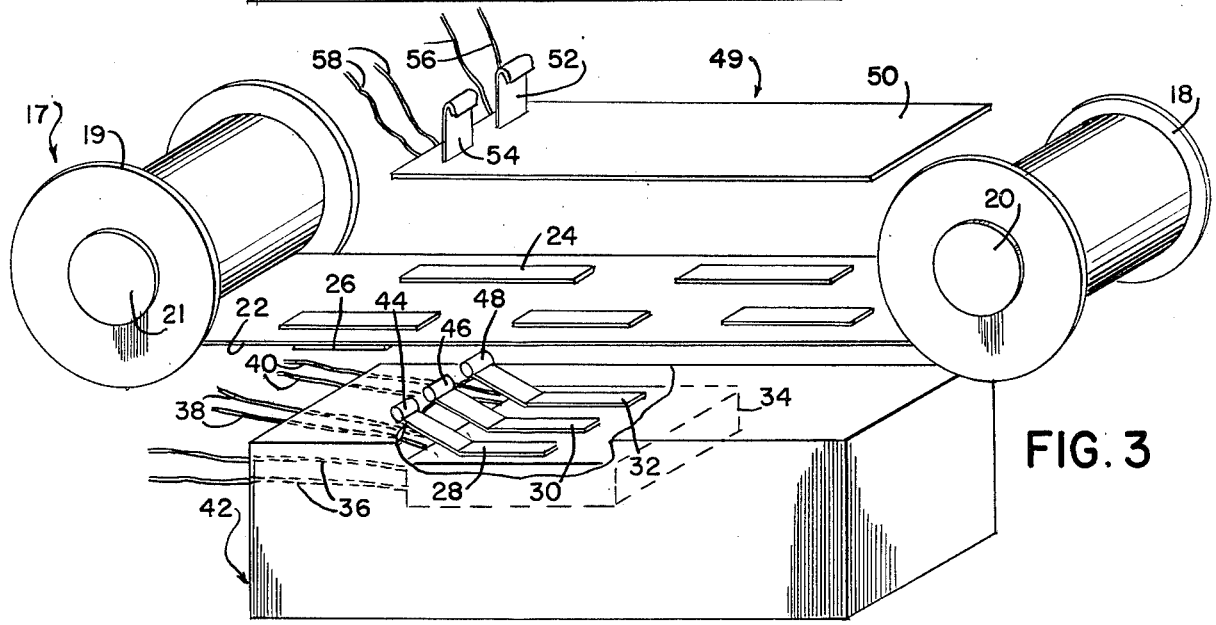
FIG. 3 shows an exploded view of the programmed steering and cutting blade control apparatus configured for performing normal cuts.

In cases where a regular or normal cutting of the lawn, golf course, etc., is desired, the upper actuating means 49 is disposed as shown in FIG. 3. In this configuration, the micro switches 52 and 54 will remain in the closed position and the associated cutting blades will remain in the operating mode throughout the entire mowing operation.

The lower actuating means is substantially shown at 42. The lower actuating means consists of a block 34 which has disposed thereon in substantial lateral alignment micro switches 28, 30 and 32. Each of the micro switches, 28, 30 and 32 have paired leads 36, 38 and 40 respectively, which are connected thereto and extend from a block 34. The micro switches 28, 30 and 32 have ends 44, 46 and 48 respectively. The paired leads 38 and 40 are connected to a turning wheel motor. These leads are so connected such that the closing of micro switch 32 will cause the turning motor to turn in a first direction and the closing of micro switch 30 will cause the turning motor to turn in an opposite direction. Paired leads 36 are connected to a braking means wherein when micro switch 28 is closed, it will effectuate braking of the two drive wheels. The three micro switches 28, 30 and 32 are in substantial lateral alignment to correspond with the three rows of rectangular members fixed to nylon tape 22.

Micro switches 28, 30 and 32 are utilized to effectuate turning and braking of the self-contained lawn mower to form a cutting operation thoughout a pre-planned route.

The rectangular members 26 in the rows that correspond to micro switches 30 and 32 are disposed such that micro switches 30 and 32 will not be closed at the same time. Micro switch 28 does not have this limitation and can be closed in conjunction with either of the other two micro switches 30 or 32.

In an operating configuration, the ends of micro switches 28, 30 and 32, shown at 44, 46 and 48 respectively, initially rest against nylon tape 22. Initially, the micro switches rest against nylon tape 22 and are in an open position. When nylon tape 22 is reeled onto reel 19, the rectangular members 26, in accordance with a particular program will selectively close the three micro switches 28, 30 and 32 by contact with ends 44, 46 and 48 respectively, thus closing of the micro switches to effectuate the desired turning and braking required to accomplish cutting, in a desired style, any lawn, golf course, etc.

It is to be noted that tape 22 and reels 18 and 19 are removable and any tape may be substituted.

FIG. 4, shows generally at 60 a safety bumper system which is disposed on the front part of the self-contained lawn mower and other safety features. The invention's other safety features are lights 67 for night mowing and antenna 6 for day location.

The bumper system, shown generally at 60, has a pre-determined pressure at which the bumper 64 will depress when contacting an obstacle, that will open the drive circuit and shut down the self-contained lawn mower.

The bumper 64 has three rods connected to it, 62, 63, and 69. Rods 62 and 63 slidably extend into the housing 4 and provide support for the bumper 64. The rods 62 and 63 are respectively thereon disposed between the housing 4 and bumper 64. The purpose of springs 66 and 68 is to return the bumper 64 back to the original position after bumper has been depressed and the obstacle has been removed.

Rod 69 is connected to bumper 64 and extends into housing 4. When bumper 64 is depressed toward the housing 4, by contacting an obstacle, rod 67 is depressed and contacts a micro switch inside the housing which creates an open in the drive circuit and de-energizes the circuit to shut-down the self-contained lawn mower. Upon removal of the obstacle, the return springs 66 and 68 restore the bumper 64 to the original position, the micro switch will close and the drive circuit will again be energized so the self-contained lawn mower can continue on its preplanned route.

FIGS. 5 and 6 show generally at 70 a means and method to drive the drive wheels and turn the reel 19 of FIGS. 1 and 2. The arrangement of the driving apparatus of FIGS. 5 and 6 is used to ensure that the turning of reel 19 is always synchronized with the turning of drive wheels. This is necessary, for without such synchronization, the drive wheel may be slowed by high grass or uphill terrain resulting in the programmed tape being ahead of the self-contained lawn mower's actual position along the preplanned route. Once this happened, the self-contained mower would not cut along the preplanned route.

To overcome this problem, the drive motor 71 has a stub shaft 72 extending therefrom with a small sprocket 74 attached to the end of the shaft 72.

Spaced apart and below sprocket 74 is a second larger sprocket 78, rotatably mounted on shaft 80. Attached to one side of sprocket 78 is flexible shaft 84 which attaches to reel 19 at the opposite end. A protective casing 82 surrounds the flexible shaft 84 to prevent interference with the turning of flexible shaft 84.

Figure 13:
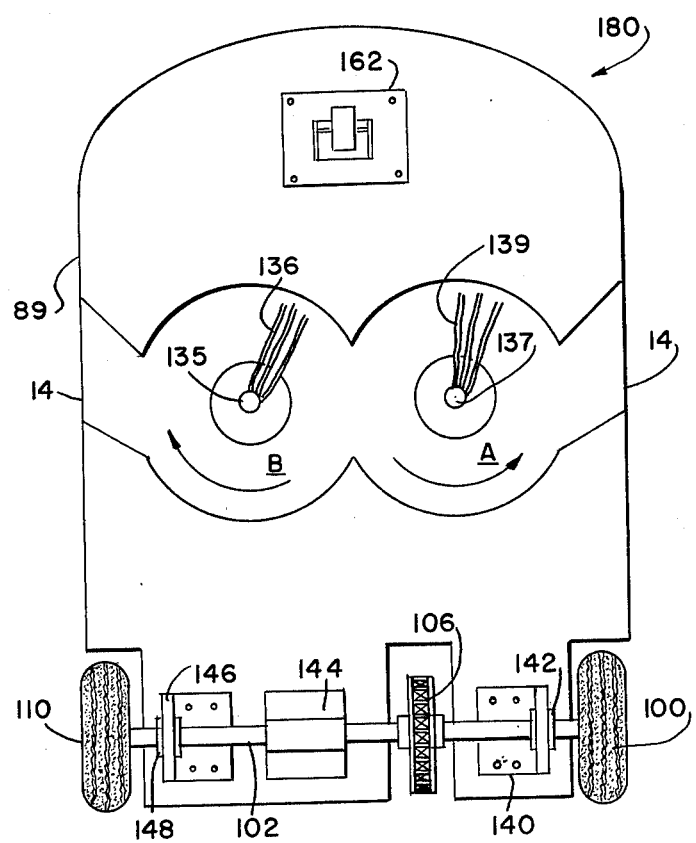
FIG. 13 shows the bottom view of the base of the self-contained lawn mower apparatus.

Spaced apart and below sprocket 78 is a third sprocket 86, larger than sprocket 78, and rotatably mounted on shaft 88 or fixably attached to drive wheel shaft 102 as shown in FIGS. 7, 9 and 13.

In the preferred embodiment the sprocket 106 is attached to the drive wheel shaft 102.

In a second embodiment, as shown in FIG. 5, a flexible shaft 90 is attached to one side of sprocket 86 and the flexible shaft 90 connects to the drive wheel differential. A protective casing 92 surrounds the flexible shaft 90 to prevent interference with the turning of flexible shaft 90.

The sprockets 74, 78 and 86 (or 106) are connected via chain 76 as seen in FIG. 6. Chain 76 is disposed around sprocket 74 and 86 and engages the teeth of the respective sprockets. Also, chain 76 engages the teeth of sprocket 78. The sprockets will turn at a predetermined ratio in respect to each other dependent on the size of the sprockets.

It follows that in cases where there is high grass or terrain changes and the drive wheels are slowed, because of the direct connection of sprockets 74, 78 and 86 (or 106) via chain 76, the turning of reel 19 will be slowed so continued synchronization of the turning of reel 19 and turning of the drive wheels is achieved. This ensures that the position of the self-contained lawn mower is consistant with the position indicated on the programmed tape along the preplanned route.

As set forth in the foregoing the self-contained lawn mower can operate one of the two cutting blades alone or both simultaneously. Additionally, as set forth above, the individual cutting blades are vertically adjustable so cutting of different grass heights can be accomplished.

Since the self-contained lawn mower can accomplish the functions of the preceding paragraph, it gives rise to different methods of cutting a lawn, golf course, etc. The following are examples of method of cutting, but those specified are not all inclusive.

EXAMPLE 1

The self-contained lawn mower can be set to make a standard cut along the preplanned route. The cutting blades are set at a desired height and the entire lawn is cut at an even height. This is accomplished by either making a nylon tape 22 with rectangular member 26 only disposed on the lower side of the nylon tape 22 and the upper side of the nylon tape 22 has no rectangular member 24 thereon disposed; or by configuring the control apparatus as shown in FIG. 3.

EXAMPLE 2

The self-contained lawn mower control apparatus is set as in FIG. 2 to accomplish a special cut. The cutting blades are set at a desired height. The self-contained lawn mower will travel along the preplanned route and the cutting blades will be selectively energized and de-energized to cut grass at specific positions along the route. This can be used to cut a specific design.

EXAMPLE 3

The self-contained lawn mower control apparatus is set as in FIG. 2 to accomplish a special cut. The cutting blades are set at a desired first cutting height. The self-contained lawn mower cuts along a first preplanned route for a first cut. The cutting blades are selectively energized and de-energized to accomplish the first cut. Change condition of the cutting blades to a desired second cutting height that is less than the first cutting height. Cutting along a second preplanned route for a second cut. The result is a lawn cut in a design with cuts at different heights.

FIG. 7, generally at 90, shows the top view of the base of the self-contained lawn mower apparatus. The battery support 92 disposed near the rear of the mower provides the supporting frame for battery 152 shown in FIG. 9. The battery support 92 has an orifice 91 which is treaded or untreaded to receive wing screw 150 (FIG. 10) which treadibly engages bracket 156 (FIG. 10) of turning motor 154 (shown in FIGS. 10 and 11).

The phantom lines shown at 94 indicate the mounting position of the turning motor 154 and the orifice in which the turning motor shaft 168 (FIG. 12) extends through and connects to the turning wheel assembly 166, 170 and 172 (FIG. 12).

FIG. 8 shows a cutting blade motor 120 with a cutting blade 136 attached and having paired leads 122. The leads connect to the micro switches for controlling the cutting blade motor. The cutting blade motor 120 is attached to support mount 96 that is fixed to base 89. To prevent the body of cutting blade motors 120 from rotating when the mower is in operation, threaded members 124 and 126 are disposed in holes 98 and 99 of the support mounts 96 and 97. The motor 120 is then secured by nuts 128 and 130 as shown in FIG. 9.

The cutting blade 136 consists of a plurality of monofiliment strands and when rotated effect cutting. However, the invention contemplates other types of strands for use as cutting blades or a rigid blade may be used.

The preferred embodiment of the invention as shown in FIGS. 7, 9 and 13 has the drive sprocket 106 disposed on the drive wheel shaft 102. In another embodiment the drive sprocket 86 drives a flexible shaft 90, as shown in FIG. 5, which in turn drives a differential (not shown) as previously shown and described.

FIG. 9 shows a front view of the self-contained lawn mower. The two cutting blade motors 120 are in place and secured to support mounts 97 and 98, the turning wheel motor 154 in place and secured from rotation by wing screw 150. Drive wheel shaft 102 with the drive sprocket 106 thereof disposed is supported by angle supports 140 and 146 having bearings 142 and 148 respectively. Shaft 102, is also supported by support member 144. The drive wheels 100 and 110 are attached to the ends of shaft 102.

FIGS. 10, 11, and 12 show different views of the turning wheel motor 154 and the turning wheel assembly shown at 162, 104, 166, 168, 170 and 172. Bracket 156 attached to the top of turning wheel motor 156 has a portion which extends radially outward from the motor body. The bracket 156, at the distal end is drilled and tapped at 151 to receive the threaded wing screw 150 to secure the motor 154 from rotation. When it is desired to manually turn the self-contained lawn mower, the wing screw 150 is removed and the motor 154 will "free wheel" with the turning of the turning wheel 170.

FIG. 11 shows the turning wheel motor 154 in full view. The bracket 156 is attached to the top of the motor 154. Paired leads 153 and 155 are connected to the respective micro switch on the lower actuator means shown in FIGS. 2 and 3. One pair of leads are wired to turn the motor in one direction and the other pair of leads are wired to the motor in the opposite direction.

In FIG. 12, the mounting plates 160 and 162 are disposed on either side of the base 89. The plates 160 and 162 receive the turning wheel motor 154 and the turning wheel bearing 164 respectively. The shaft 168 of turning wheel motor 154 connects to the turning wheel 170 via wheel bracket 166 and wheel shaft 172. The upper portion of the wheel bracket 166 contacts wheel bearing 164 to allow turning of the wheel 170. When the weight of the self-contained lawn mower is on the wheel 170. The wheel bearing 164 is inset in plate 162 to insure it remains in position.

FIG. 13 shows the bottom view of the self-contained lawn mower apparatus. The cutting blades 136 and 139 respectively turn in opposition to each other in directions B and A respectively. The grass cut is discharged through discharge ports 14 disposed on either side of the self-contained lawn mower apparatus.

The drive wheel assembly is shown in FIG. 13. Drive wheels 100 and 110 are attached to ends of shaft 102. Shaft 102 is supported by angle supports 140 and 146, with respective wheel bearings 142 and 148, and support member 144. In this embodiment the drive sprocket 106 is disposed on the shaft 102.

This invention is not limited to only what is disclosed, but to all equivalents thereto.

I claim:

1. A programmed steering and cutting blade control apparatus for self-contained lawn mowers having steering control means and cutting blade control means comprising:
   a flexible elongated member;
   actuating means disposed on an upper and lower surface of said flexible elongated member; said actuating means embodying in code a predetermined series of steering and cutting blade commands;
   a plurality of rotatable storage means for retaining said flexible elongated member;
   actuator means disposed above and below said flexible elongated member for contacting actuating means thereon to read the coded commands thereon; said actuator means being connected to the steering control means and cutting blade control means for operating those means in a manner dictated by the coded commands.

2. The control apparatus of claim 1 wherein the flexible elongated member is a nylon tape.

3. The actuating means of claim 1 wherein the said actuating means are a plurality of rectangular members permanently fixed to said flexible elongated member.

4. The actuating means of claim 3 wherein the rectangular members are substantially the same width and thickness and vary substantially in length.

5. The actuating means of claim 3 wherein the rectangular members disposed on said flexible elongated member form raised members.

6. A programmed steering and cutting blade control apparatus for self-contained lawn mowers of claim 1, the actuator means further comprising a plate and a plurality of switch means disposed adjacent said flexible elongated member.

7. The actuator means of claim 6 wherein the plurality of switch means are disposed on a lateral face of the plate substantially adjacent to one end of said plate.

8. The switch means of claim 7 are micro switches.

9. The switch means of claim 7 wherein the switch means is attached at a proximal end to the plate and extends perpendicular from said plate and terminates with a substantially curved distal end.

10. The plate of claim 7 wherein said plate is removable and detachably fixable to dispose the switch means toward or away from the flexible elongated member.

11. A programmed steering and cutting blade control apparatus for self-contained lawn mowers of claim 1, the actuator means further comprising a plurality of switch means laterally disposed and permanently attached to a fixed support means.

12. The actuator means of claim 11 wherein the switch means are micro switches.

13. The switch means of claim 12 wherein a first portion of the switch means is attached to the support means, a second portion terminates with a bulbous end and said second portion forms an obtuse angle with said first portion.

14. A programmed steering and cutting blade control apparatus for self-contained lawn mowers having steering control means comprising a flexible elongated member, actuating means disposed on a surface of said flexible elongated member, said actuating means embodying in code a predetermined series of steering commands, a plurality of rotatable storage means for retaining said flexible elongated member, actuator means disposed adjacent said flexible elongated member for contacting actuating means thereon to read the coded commands thereon, said actuator means being connected to the steering control means for operating said means in a manner dictated by the coded commands.

15. The control apparatus of claim 14 wherein the flexible elongated member is a nylon tape.

16. The actuating means of claim 14 wherein the said actuating means are a plurality of rectangular members permanently fixed to said elongated member.

17. The actuating means of claim 16 wherein the rectangular members are substantially the same width and thickness and vary substantially in length.

18. The actuating means of claim 16 wherein the rectangular members disposed on said flexible elongated member form raised members.

19. The apparatus of claim 1 further comprising:
a base supported by a plurality of wheels;
a drive means having a shaft with a first gear means disposed at an end thereof;
a second gear means of greater diameter than said first gear means disposed for driven connection with said first gear means with rotatably connecting means connecting said second gear means to at least one of said rotatable storage means;
a third gear means of greater diameter than said first gear means, disposed for driven connection with said first gear means with rotatable connecting means connecting said third gear means to at least one of said wheels for drivingly rotating said wheel to move said base;
the first, second and third gear means having connecting means wherein angular displacement of said first gear means will similarly angularly displace the other two gear means.

20. The first, second and third gear means of claim 19 are sprockets.

21. The rotatable means of claim 19 for connecting said second gear means and said rotatable storage means is a flexible shaft.

22. The rotatable means of claim 19 for connecting said third gear means and said wheel is a flexible shaft.

23. The connecting means of claim 19 for connecting said first, second and third gear means is a chain.

24. The angular displacement of gear means of claim 19 wherein the ratio of displacement of said first, second or third gear is constant with respect to the other two gear means.

25. A method of programmed steering and cutting blade control for self-contained lawn mowers comprising:
disposing a first actuator means comprising a plate and a plurality of switch means with said switch means away from a flexible elongated member;
rotating at substantially the same speed a plurality of storage means unreeling the flexible elongated member from a first storage means and reeling the flexible elongated member onto a second storage means;
actuating a second actuator means by raised members fixed to a surface of said flexible elongated member, containing and selectively energizing a plurality of switch means; said raised members being arranged to code a predetermined series of steering commands.

26. The method of claim 25 wherein actuating the second actuator means comprises selectively actuating a left turn switch means, a right turn switch means or braking switch means.

27. A method of programmed steering and cutting blade control for self-contained lawn mowers of claim 25 comprising:
disposing the first actuator means comprising the plate and plurality of switch means with said switch means disposed toward the flexible elongated member;
actuating the first actuator means by raised members fixed to a surface of the flexible elongated member contacting switch means attached to said plate, said raised members being arranged to code a predetermined series of cutting blade commands.

28. The method of claim 27 wherein actuating said second actuator means comprises selectively actuating a left turn switch means, a right turn switch means or braking switch means.

29. The method of claim 27 wherein actuating said first actuator means comprises selectively deactuating first left cutting blade or a second right cutting blade.

30. A method of programmed steering and cutting blade control for self-contained lawn mowers of claim 25 having one or a plurality of cutting blades set at a first height;
cutting along a first preplanned route selectively energizing and de-energizing the cutting blades and discharging grass cut to either side;
completing a first cut along the preplanned route, changing the condition of the cutting blades and cutting along a second preplanned route cutting at a second cutting blade height;

completing a second cut along a second preplanned route selectively energizing and de-energizing the cutting blades and discharging grass cut to either side.

31. A method of programmed steering and cutting blade control for self-contained lawn mowers of claim 30 comprising setting the cutting blades at a height and cutting along a preplanned route discharging grass cut to either side.

32. The method of claim 25 further comprising:
driving a first gear means connected to a second gear means and a third gear means;
rotating the second gear means by rotating said first gear means thereby simultaneously rotating a one of said storage means connected to said second gear means;
rotating the third gear means by rotating the first gear means thereby simultaneously rotating a drive wheel means connected to said third gear means for drivingly moving said lawn mower.

33. The method of claim 32 wherein the first gear means rotates said second and said third gear means at a constant gear ratio.

34. The method of claim 33 wherein rotating said first gear means at a slower rotational speed will slow the rotational speed of said second and third gear means and increasing the rotational speed of said first gear means will increase the rotational speed of said second and third gear means according to the gear ratio between said first and second gear means and said first and third gear means.

* * * * *